United States Patent [19]
Dugan

[11] 3,855,132
[45] Dec. 17, 1974

[54] OPEN TROUGH FILLER

[75] Inventor: William P. Dugan, Media, Pa.

[73] Assignee: Sun Ventures, Inc., St. Davids, Pa.

[22] Filed: Apr. 30, 1974

[21] Appl. No.: 465,468

Related U.S. Application Data

[63] Continuation of Ser. No. 387,398, Aug. 10, 1973, abandoned, which is a continuation-in-part of Ser. No. 275,679, July, 1972, abandoned.

[52] U.S. Cl. .................. 210/455, 210/474, 210/483
[51] Int. Cl. ........................................... B01d 35/02
[58] Field of Search .......... 210/169, 170, 455, 474, 210/483; 138/DIG. 9; 55/DIG. 40, DIG. 13, 234, 440; 52/12; 61/10, 11, 16

[56] References Cited
UNITED STATES PATENTS

| | | | |
|---|---|---|---|
| 3,711,259 | 1/1973 | Gurney | 138/DIG. 9 |
| 901,582 | 10/1908 | Austin | 61/10 |
| 3,410,057 | 11/1968 | Lerner | 55/DIG. 13 |
| 2,209,741 | 7/1940 | Sullivan et al. | 55/DIG. 31 |
| 3,304,696 | 2/1967 | McKenna | 55/440 |
| 3,720,319 | 3/1973 | White | 210/169 |
| 3,428,183 | 2/1969 | Blistow | 210/474 |

Primary Examiner—Theodore A. Granger
Attorney, Agent, or Firm—George L. Church; Donald R. Johnson; Anthony J. Dixon

[57] ABSTRACT

An open trough or labyrinthine such as a rain gutter, with reticulated porous foam material fitted therein containing a myriad of slightly tortuous or babyrinthine passages through which water or other liquid to be carried by the sliceway can flow but which serves as a barrier to foreign matter such as leaves, dirt, paper, etc., which would otherwise block the trough, thus preventing clogging or blocking of said trough.

9 Claims, 2 Drawing Figures

OPEN TROUGH FILLER

CROSS REFERENCE TO RELATED APPLICATION

This is a continuation, of application Ser. No. 387,398 filed Aug. 10, 1973 now abandoned, which in turn is a continuation-in-part of Ser. No. 275,679 filed July 27, 1972 now abandoned.

BACKGROUND OF THE INVENTION

This invention relates to open troughs and particularly rain gutters with means to prevent blocking of said gutters by foreign material.

Eaves, troughs or rain gutters, installed along the low edges of sloping roof, frequently become clogged with leaves, paper scraps and the like, carried to the roof by the wind and washed therefrom into the gutter. Such debris fills and clogs the troughs, causing water to overflow, and likewise plugs downspouts, producing malfunctions of the eaves trough system.

Many devices have been suggested in the past to overcome this problem, such as perforated cover plates, screens and woven lattice-work structures, designed to collect leaves and debris before they are carried into the gutters of the eaves trough system. Leaves often become caught and embedded in the perforations and the openings of such structures, however, and very often they are completely clogged by leaves, which remain water soaked in a sodden mass which must periodically be removed by hand in order to restore the eaves trough system to proper operating condition.

SUMMARY OF THE INVENTION

Accordingly, it is a principal object of the present invention to provide a trough or sluiceway for conveying liquid which is not subject to clogging by foreign debris.

More particularly, a rain gutter or similar sluiceway is fitted with a reticulated porous foam material, such as polyurethane, which fills the interior passageway of the gutter or trough allowing liquid to flow through while causing solid debris to be retained on the surface thereof, where said material can dry and blow away or be easily brushed therefrom.

For a fuller understanding of the nature and objects of the invention, reference should be had to the following detailed description taken in connection with the accompanying drawing.

DESCRIPTION OF THE DRAWING AND PREFERRED EMBODIMENT

The sectional view in

Water cascading from the sloped roof, 4, carrying foreign debris from the roof, falls into the inclined foam surface 6 and is gravity fed through the foam in a vertical direction and along the gutter in a horizontal direction corresponding to the pitch of said gutter. The debris is trapped on the surface of the foam filler and either dries and is blown away or is easily brushed off said surface. In either case the debris does not block downspouts attached to said gutters or form soggy masses along the bottom of said gutters.

Although the above use is preferred, other adaptations of the same invention are possible such as open-hole drains or open slot drains. The upper surface of the filler, although preferred as shown, may be inclined toward the roof, horizontal or of hemispherical configuration.

Figure 1:
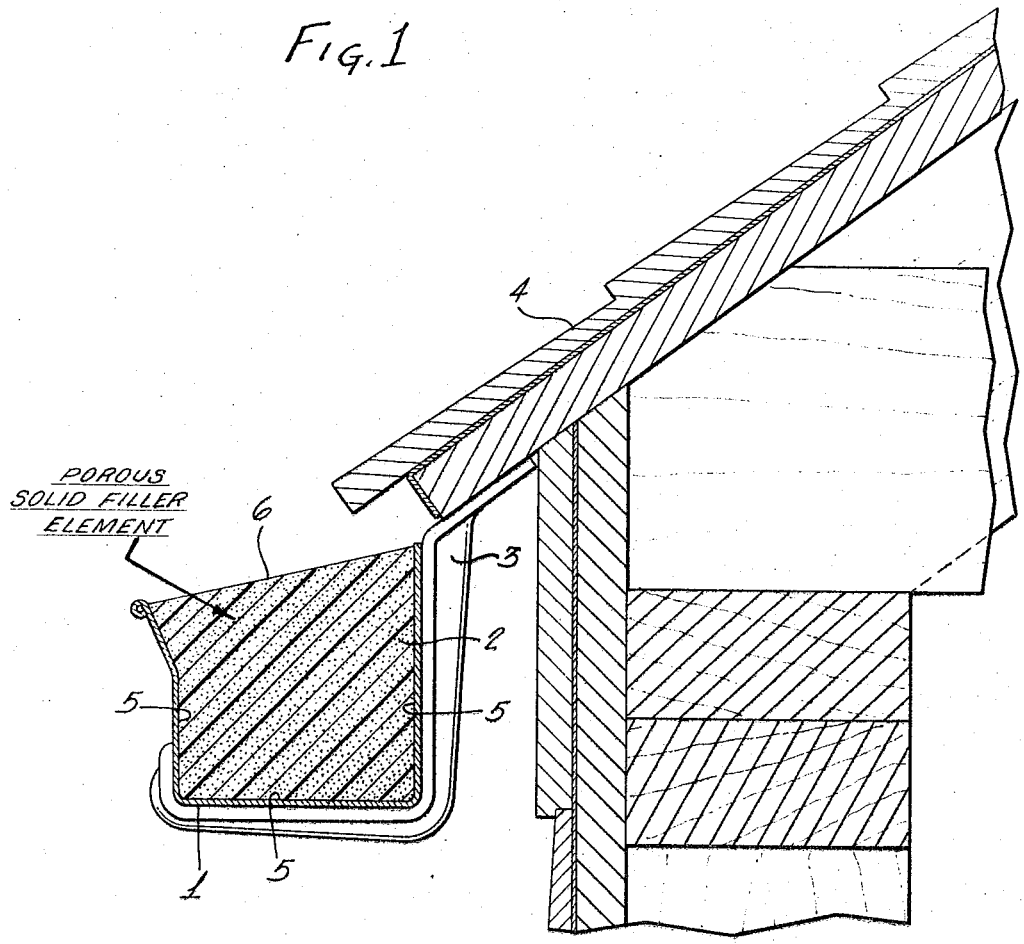
FIG. 1 shows a rain gutter, 1, attached to a sloped roof, 4, at point 3 by conventional attaching or gutter-hanging means not shown.
Figure 2:
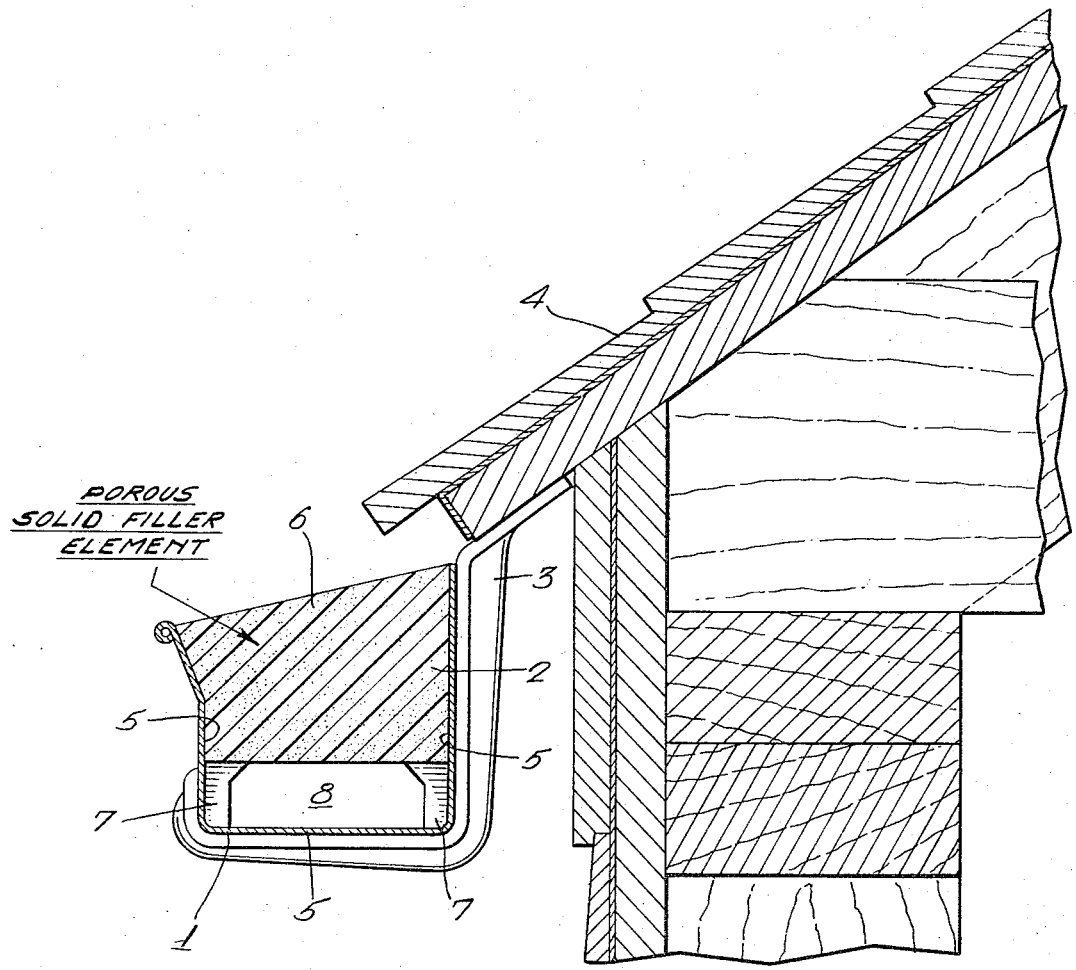
FIG. 2 shows another embodiment of the invention. The trough or channel of the gutter is fitted with a section of porous form, 2, which corresponds in shape to the interior gutter walls, 5, and occupies the entire volume defined by said gutter walls.

It is also envisioned as shown in FIG. 2 that a space or open-passageway 8 is left between the foam filler, 2, and the bottom of the trough, 5, so as to allow for free flow of liquid below the porous section while still achieving the debris blocking advantages of said porous section. This configuration may be achieved by forming the filler with a precut slot on its lower side or by forming the filler in a size smaller than the depth of the trough and providing spaced supports 7 along the length of the trough to support the filler and to maintain the open passageway between it and the bottom of the trough.

In all cases the foam used must be porous and the polyurethane variety meets this criterion and is preferred. This material has added advantages in that it is easily molded to fit the gutter shape desired, does not add appreciable weight to the structure and is readily commercially available. Although a rigid foam cut to the desired shape is preferred, the filler may be flexible, cut to a larger size and compressed to fit the trough. Also envisioned are more than one piece of compressible foam compressed together to fill the trough. These compressible pieces may be circular or rectangular in cross section so long as they fit the trough in their compressed form.

Although the precentage of void volume in the form used is not critical, higher void volume increases the water capacity of the filler. An example of a suitable porous solid is one with 95 percent void volume with an average of 10 pores per lineal inch.

The invention claimed is:

1. A rain gutter in combination with a roof comprising an upper inlet and a lower outlet through which a liquid passes, and a filler element made of a reticulated porous solid material positioned within the volume defined by the interior walls of said rain gutter whereby liquid may enter said inlet and flow through said filler and said outlet and foreign debris will be trapped on the surface of said filler.

2. The assembly of claim 1 wherein the porous solid is polyurethane foam.

3. The assembly of claim 1 wherein the upper surface of said reticulated porous solid filler element is inclined.

4. The assembly of claim 1 wherein the porous solid occupies essentially all of the interior volume of said rain gutter.

5. The assembly of claim 1 wherein the porous solid does not occupy all of the interior volume of said rain gutter and defines an open passageway between the lower side of said filler and the bottom of said rain gutter through which liquid can flow.

6. The assembly of claim 5 wherein said filler is maintained above the bottom of said rain gutter by vertical supports positioned between said filler and said rain gutter and spaced along the length of said rain gutter.

7. The assembly of claim 6 wherein the rain gutter is attached along the lower edge of a sloping roof whereby rain flowing over said lower edge will enter said rain gutter.

8. The assembly of claim 5 wherein the rain gutter is attached along the lower edge of a sloping roof whereby rain flowing over said lower edge will enter said rain gutter.

9. The assembly of claim 1 wherein the rain gutter is attached along the lower edge of a sloping roof whereby rain flowing over said lower edge will enter said rain gutter.

* * * * *